United States Patent [19]
Menke et al.

[11] Patent Number: 5,357,411
[45] Date of Patent: Oct. 18, 1994

[54] FLASHLIGHT FOR FIREFIGHTING AND OTHER SPECIALIZED USES

[76] Inventors: W. Kenneth Menke; W. Kenneth Menke, III, both of 415 Park Ave., Glendale, Mo. 63122

[21] Appl. No.: 82,768

[22] Filed: Jun. 25, 1993

Related U.S. Application Data

[62] Division of Ser. No. 938,905, Aug. 31, 1992, Pat. No. 5,239,451.

[51] Int. Cl.$^5$ .............................................. F21L 7/00
[52] U.S. Cl. .................................. 362/183; 362/202; 315/56
[58] Field of Search ............... 362/190, 199, 202, 208, 362/399, 183; 315/33, 56

[56] References Cited

U.S. PATENT DOCUMENTS

| | | | |
|---|---|---|---|
| Re. 31,458 | 12/1983 | Trattner | 429/100 |
| 1,363,132 | 12/1920 | Lander | 362/202 |
| 1,875,956 | 9/1932 | Thiel | 362/184 |
| 2,608,639 | 8/1952 | Packer et al. | 362/199 |
| 2,774,860 | 12/1956 | Prebol et al. | 362/184 |
| 2,966,580 | 12/1960 | Taylor | 362/201 |
| 3,535,506 | 10/1970 | Moore et al. | 362/184 |
| 3,601,595 | 8/1971 | Kivela | 362/199 |
| 3,735,119 | 5/1973 | Williams, Jr. | 362/198 |
| 3,990,919 | 11/1976 | Kruegar | 429/100 |
| 4,057,677 | 11/1977 | Mabuchi | 429/100 |
| 4,397,920 | 8/1983 | Trattner | 429/100 |
| 4,428,033 | 1/1984 | McBride | 362/184 |
| 4,767,358 | 8/1988 | Nullmeyer et al. | 439/500 |
| 4,803,605 | 2/1989 | Schaller et al. | 362/184 |
| 5,008,785 | 4/1991 | Maglica et al. | 362/183 |
| 5,010,454 | 4/1991 | Hopper | 362/61 |

FOREIGN PATENT DOCUMENTS 649735 12/1928 France ................................ 362/199
882963 12/1959 United Kingdom .

Primary Examiner—Richard R. Cole
Assistant Examiner—L. Heyman
Attorney, Agent, or Firm—Rogers, Howell & Haferkamp

[57] ABSTRACT

The present invention relates to a flashlight for use by firefighters and for use in other specialized areas. In particular, the present invention relates to a flashlight comprising a body of substantially parallel, spaced tubular members that each contain a plurality of dry cell batteries for powering the flashlight. A lamp is connected at one end of the pair of tubular members for pivoting movement relative to the members through at least 90°. A support base is connected across the opposite ends of the tubular members and is configured to support the flashlight on a surface with the pair of tubular members positioned upright and elevating the lamp above the surface. The support base is removable from the ends of the tubular members to provide access to interiors of the members for inserting or removing dry cell batteries to power the flashlight. Adapters are provided for each of the tubular members to adapt their interiors to accommodate either D-size dry cell batteries or C-size dry cell batteries. An auxiliary light, separate from the flashlight, is powered by the power source of the flashlight. The flashlight includes specialized rechargeable battery packs and a recharger. The flashlight also includes circuitry to permit operation using standard batteries or the special battery packs. This circuit permits in-place recharging of the special battery packs, but does not in any way effect standard batteries which could be damaged by recharging.

17 Claims, 6 Drawing Sheets

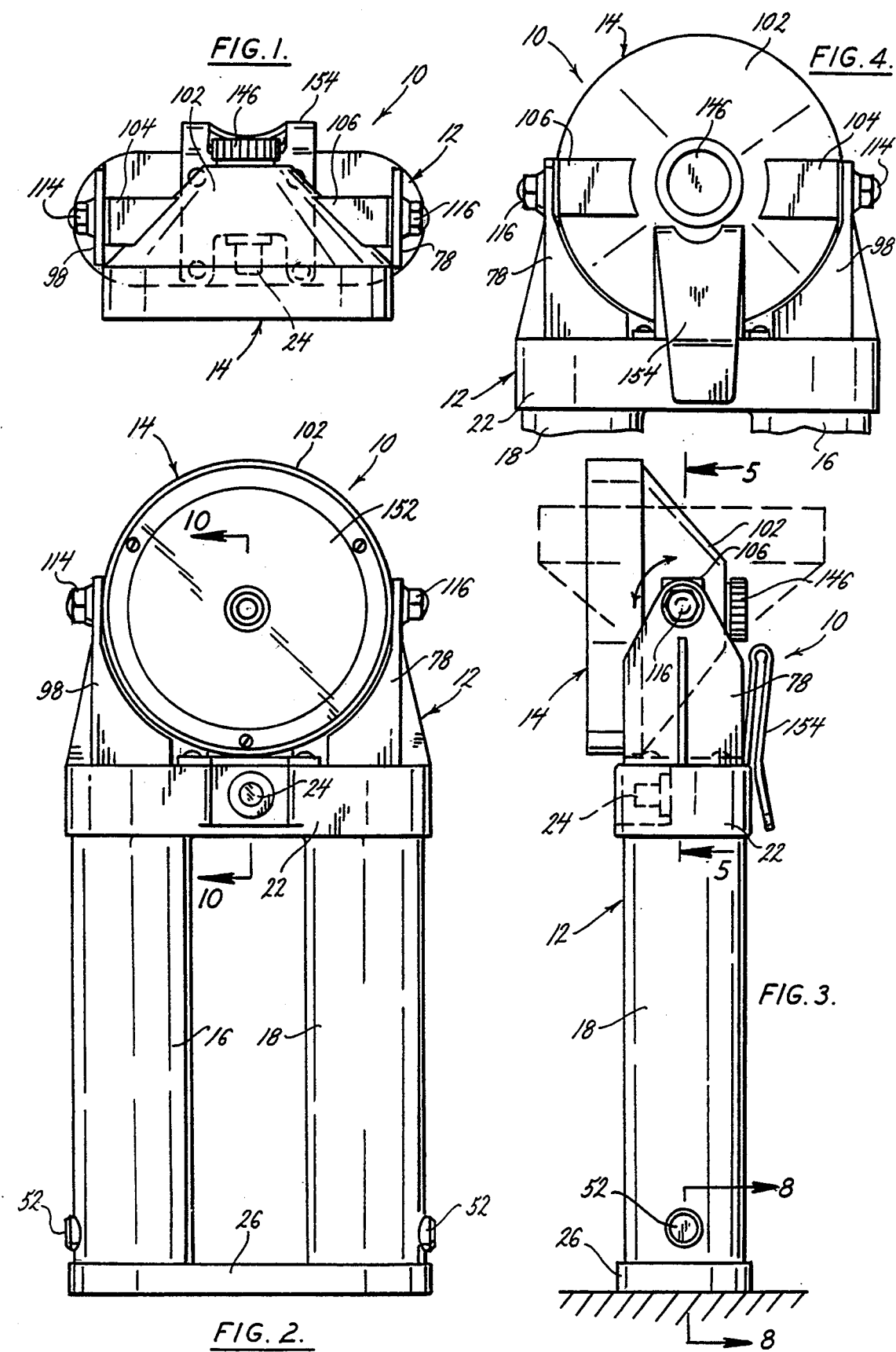

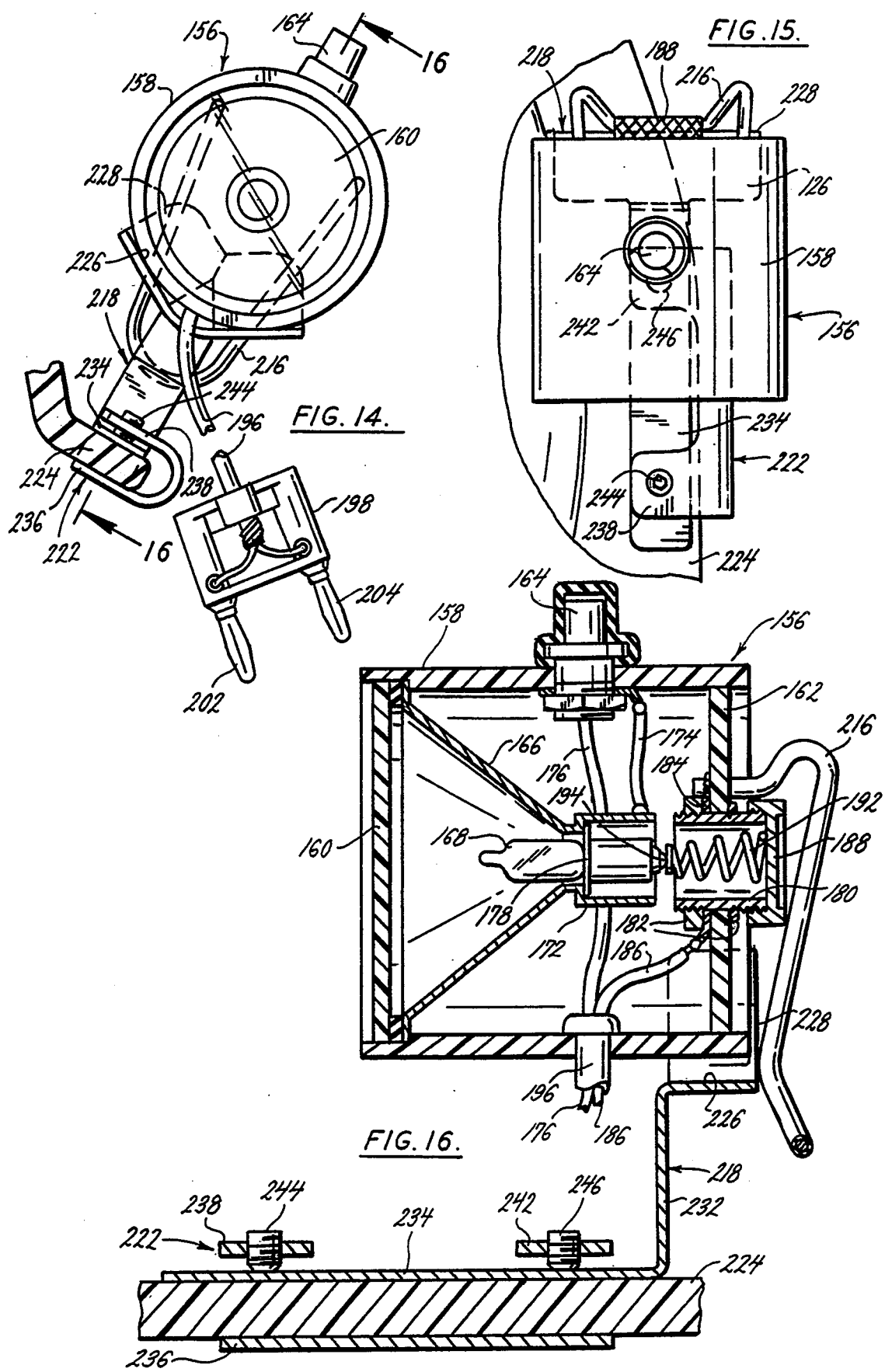

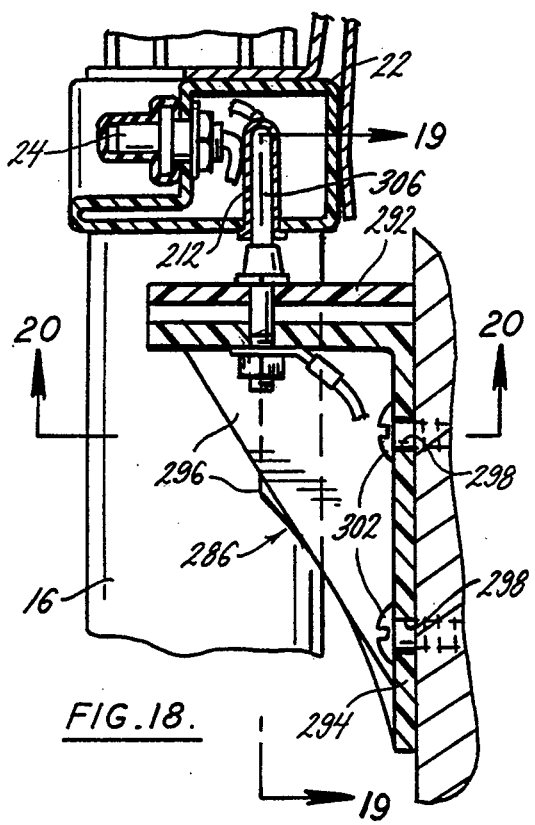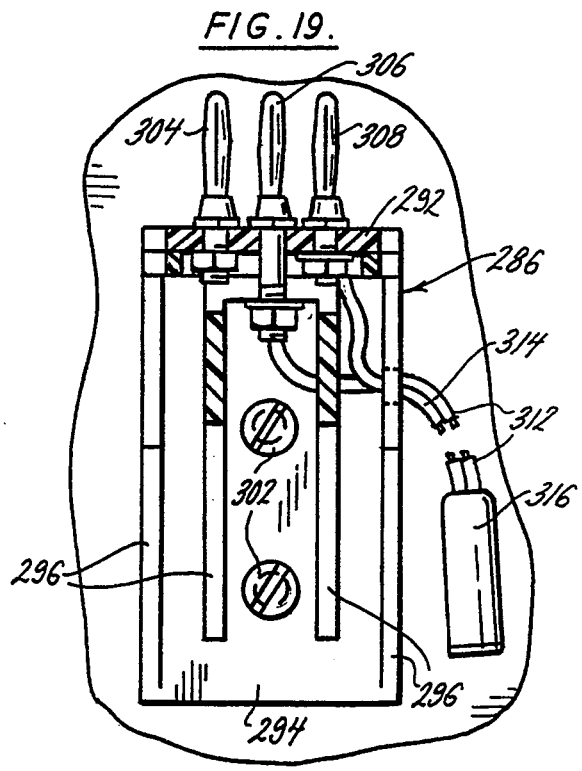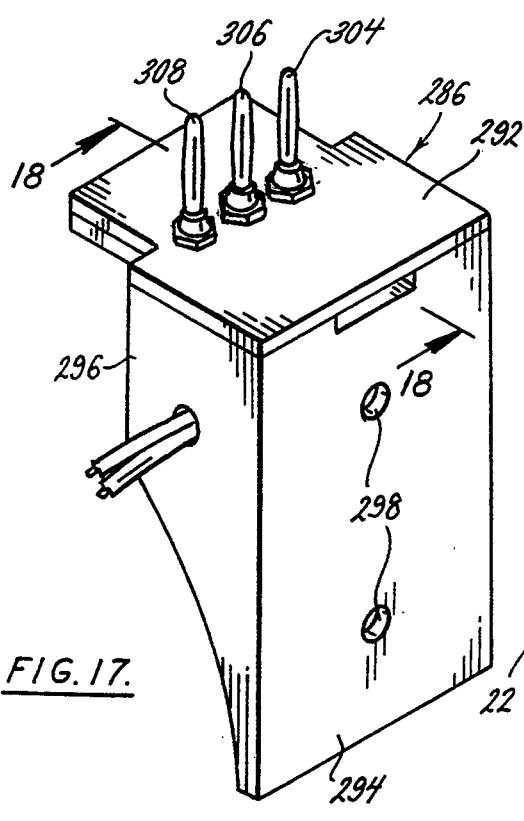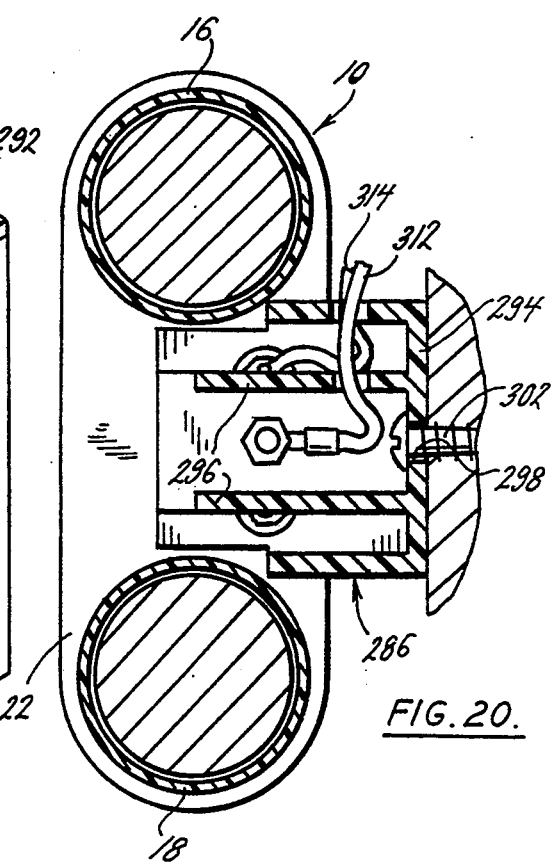

FLASHLIGHT FOR FIREFIGHTING AND OTHER SPECIALIZED USES

This is a division of copending application Ser. No. 07/938,905; filed on Aug. 31, 1992 now U.S. Pat. No. 5,239,451.

BACKGROUND OF THE INVENTION (1) Field of the Invention

The present invention relates to a flashlight and auxiliary light system for use by firefighters and for use in other specialized areas. In particular, the present invention relates to a flashlights comprising a molded body constructed with a central void defined by top and bottom transverse members of the molding, and two substantially parallel tubular side member of the molding that each contain one or more batteries for powering the flashlight. A pair trunnions project upward above the top transverse member from the pair of tubular members and a lamp is connected between the trunnions for pivoting movement through at least 90° relative to the flashlight body. The bottom transverse member is removable to provide quick access to the interiors of the tubular members of the flashlight body for insertion and removal of batteries that power the flashlight. The body molding is also provided with at least three electrical input jacks that enable the recharging of specialized rechargeable battery packs while the packs are contained within the tubular members of the body. The jacks also enable the electrical connection of other devices, such as a helmet mounted auxiliary light, by electrically communicating the light with the batteries contained in the body tubular members. Besides the auxiliary light, the electrical Jacks on the flashlight body may be employed in powering other devices such as environmental sensors, chlorine detectors, gas detectors, etc.

Battery adapters are provided for each of the tubular members of the flashlight body. The adapters enable the interiors of the tubular members to accommodate either D-size batteries or C-size batteries of both the rechargeable and disposable types.

Specialized, high performance battery packs are also provided for use with the flashlight. The specialized battery packs are specifically designed to be contained inside the tubular members of the flashlight body and recharged without removing the packs from the body. The packs are provided with a specialized connector that permits only the properly oriented, specialized battery packs to be recharged in place in the body tubular members. While ordinary dry cell batteries may be used to operate the flashlight, no damage to the batteries will result should the recharger be connected to the flashlight body containing conventional dry cell batteries.

(2) Description of the Related Art

Flashlights are known in the prior art having various different configurations and sizes. However, no prior art flashlights have been specifically designed for use in the many different situations encountered by firefighters.

When used as firefighting equipment, it is often necessary that flashlights operate fog extended periods of time without failure. This requires that the flashlight used as a firefighting tool have a sufficiently large power source to ensure ample power for illuminating the flashlight lamp for an extended period of time and preventing the firefighter using the flashlight from becoming stranded without a source of light in a smoke-filled burning building. It is desirable that the power source be quickly and easily replaced, or be rechargeable to ensure that a large supply of power is available each time the flashlight is used. It is also desirable that the bulb of the flashlight be easily replaced without requiring disassembly of the flashlight.

It is often necessary that the flashlight used in firefighting applications have some meads of suspending the flashlight from the protective clothing or equipment worn by the firefighter to free the firefighter's hands for other purposes. With fire-fighters wearing protective gloves to protect their hands from heat and flame, it is also often necessary that the flashlight used as a firefighting tool have some sort of handle configured to facilitate gripping the flashlight with a gloved hand and for carrying the flashlight in a manner that does not quickly tire the arm of the firefighter. The firefighting flashlight should also be configured so that it can be placed stationary on a surface with the lamp of the flashlight being adjustably positioned to direct the flashlight beam in a variety of directions.

SUMMARY OF THE INVENTION

The firefighting flashlight of the present invention overcomes disadvantages of prior art flashlights employed in firefighting situations by providing a flashlight specifically constructed to combine a variety of features that together enhance the flashlight's use as a firefighting tool. The firefighting flashlight of the present invention is generally comprised of a body configured to contain a source of power and to securely support and position the flashlight on a variety of surfaces, and an illuminating lamp connected to the body for pivoting movement relative thereto for directing a beam of light projected from the lamp through an arc of at least 90°. The flashlight also includes a separate auxiliary light that is powered by the flashlight's power source, and the power source is modified to employ different size dry cell or rechargeable batteries, or specialized rechargeable battery packs.

The flashlight body is molded with a central void or opening defined by a pair of hollow tubular side members that are interconnected by a pair of transverse members in a substantially parallel and laterally spaced relationship. Each of the tubular members contains circuitry to connect pluralities of dry cell batteries, rechargeable batteries or the specialized battery packs contained inside the tubular members with the lamp of the flashlight. The transverse members interconnect the tubular members in a spaced relationship with the open void between the tubular members providing ample room for the insertion of a gloved hand of the firefighter into the void when gripping either of the tubular members. One of the pair of transverse members is removable through a quick release mechanism from the flashlight body to provide access to the interiors of the tubular members for insertion and removal of standard size or rechargeable batteries or specialized rechargeable battery packs. The tubular members each contain two D-size dry cell batteries in the preferred embodiment, providing an ample power source for the lamp. The configuration of the body member is such that it can be placed on a surface with the tubular members positioned upright to elevate the lamp above the surface, or placed with the tubular members flat against the surface to provide more stable support for the flashlight. In either of these two positions, the lamp is pivotable on the body through an arc of at least 90° to direct the beam of light projected from the lamp in a variety of directions. The body of the flashlight may also be suspended from an article of clothing or equipment worn on the body of the firefighter. The lamp is also capable of being pivoted relative to the body when suspended on the firefighter to direct the beam of light in a variety of directions while freeing up the hands of the firefighter. The ability to adjust the direction of the lamp beam enables the flashlight to be carried in any manner most comfortable to the firefighter with the lamp beam adjusted to the desired direction. An auxiliary light, separate from the flashlight, is connected to the power source of the flashlight by a cable and a pronged plug that plugs into a connector on the flashlight. The auxiliary light is also capable of being attached to an article of clothing or equipment worn by the firefighter.

BRIEF DESCRIPTION OF THE DRAWINGS

Further objects and features of the present invention are revealed in the following detailed description of the preferred embodiment of the invention and in the drawing figures wherein:

FIG. 1 is a top plan view of the flashlight of the present invention;

FIG. 2 is a front elevation view of the flashlight;

FIG. 3 is a side elevation view of the flashlight;

FIG. 4 is a partial rear elevation view of the flashlight;

FIG. 14 is a front elevation view of the auxiliary light and its mounting bracket taken along the line 14—14 of FIG. 13;

FIG. 15 is a partial view showing details of the auxiliary light mounting bracket;

FIG. 16 is a partial side elevation view, in section, of the auxiliary light and its mounting bracket;

FIG. 17 is a perspective view of the recharging support bracket for the flashlight;

FIG. 18 is a partial side elevation view, in section, of the support bracket connected to the flashlight;

FIG. 19 is an elevation view, in section, of the support bracket taken along the line 19—19 of FIG. 18;

FIG. 20 is a section view of the support bracket taken along the line 20—20 of Figure 18.

DESCRIPTION OF THE PREFERRED EMBODIMENT

Figure 5:
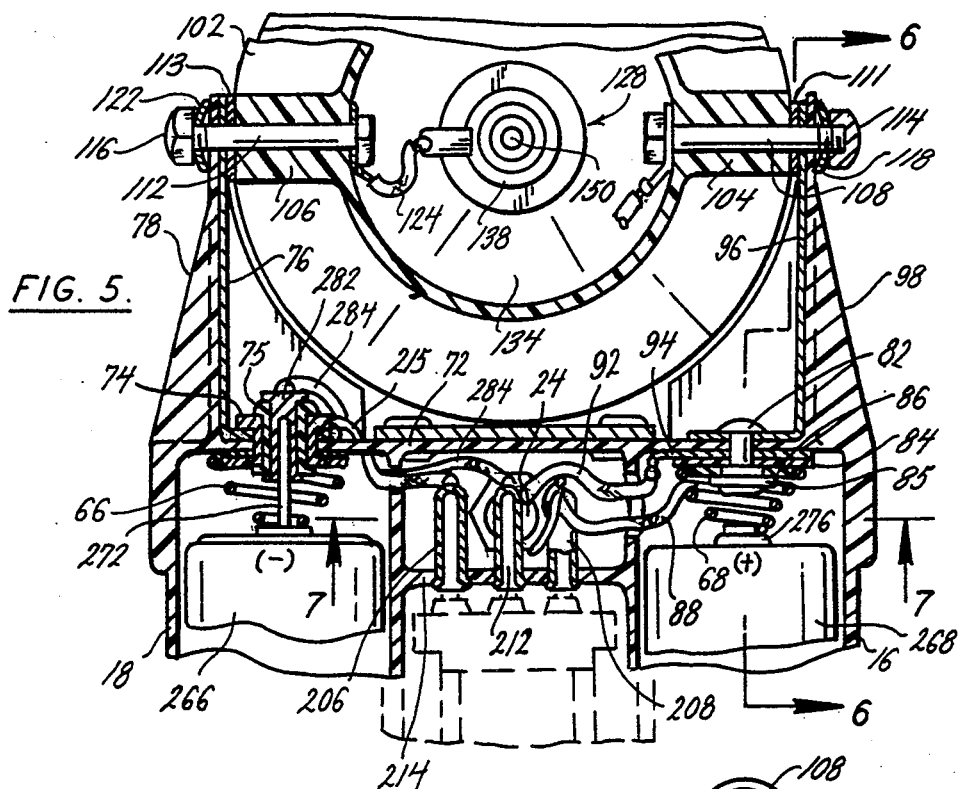
FIG. 5 is a partial rear elevation view, in section, of the flashlight.
Figure 7:
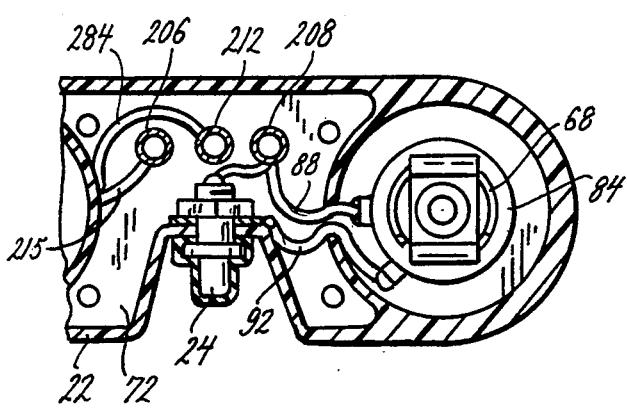
FIG. 7 is a partial view, in section, taken along the line 7—7 of FIG. 5.

The flashlight 10 for firefighting and other specialized uses of the present invention is best seen in FIGS. 1 through 4 of the drawing figures. As shown in FIG. 2, the flashlight 10 is generally comprised of a body portion 12 and a lamp portion 14. The lamp portion 14 is interconnected to the body portion 12 for pivoting movement relative thereto, and for electrical communication between circuitry contained in the lamp portion and body portion as will be explained. The flashlight may be constructed from metal or plastic or any combination of these materials.

The body portion 12 is comprised of a pair of longitudinally extending and substantially parallel body members 16, 18. Each of the body members 16, 18 are tubular and have hollow interiors for receiving pluralities of dry cell batteries, rechargeable batteries, and specialized rechargeable battery packs as will be explained, and for housing the electrical circuitry interconnecting the batteries. Although the exterior surfaces of the body members 16, 18 are shown as being cylindrical, the exterior surfaces could have other configurations.

A top transverse member 22 extends laterally between the topmost ends of the pair of body members 16, 18 as viewed in the drawing figures. A manually operable switch 24 is mounted in a recessed cavity of the transverse member 22 in a position that is easily accessible by the fingers of a user of the flashlight gripping, with either hand, one of the two body members 16, 18. The interior of the transverse member 22 is hollow and contains the electrical circuitry interconnecting the circuitry of the tubular members with the circuitry of the lamp portion 14 yet to be explained.

Figure 8:
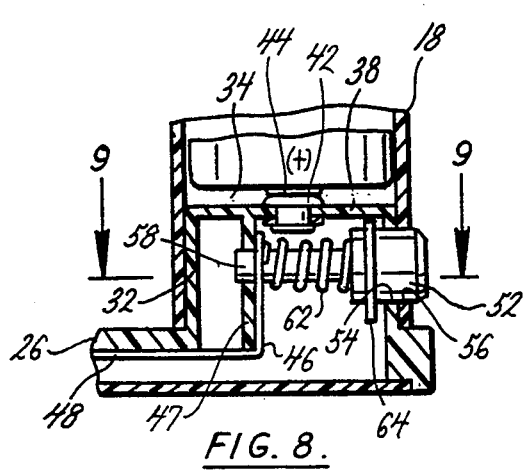
FIG. 8 is a partial view, in section, taken along the line 8—8 of FIG. 3.
Figure 9:
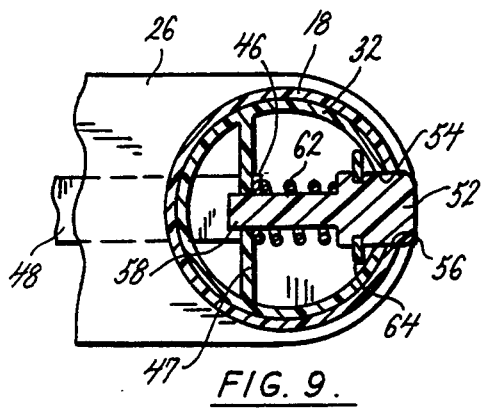
FIG. 9 is a partial view, in section, taken along the line 9—9 of FIG. 8.

A second transverse member 26 is connected between the opposite ends of the body members 16, 18 from the first described transverse member 22. The second transverse member 26 also serves as a closure member and a support base for the flashlight. The member 26 is removably attached to the lower ends of the body members 16, 18 by a pair of hollow, cylindrical posts 32 that are removably insertable into openings at the bottom ends of the two body members 16, 18. The construction of each post 32 and its insertion into a body member opening is substantially identical and only one post and one body member opening will be described with reference to FIGS. 8 and 9. As seen in FIGS. 8 and 9, the interiors 34 of each of the body members 16, 18 are cylindrical and have interior diameters dimensioned sufficiently large to accommodate D-size dry cell batteries, rechargeable batteries or the specialized battery packs. When the term "battery" is used herein, it should be understood to mean any one of these three types of power sources unless one of the three is specifically indicated. The cylindrical posts 32 of the support base transverse member 26 have outside diameters dimensioned to enable the posts 32 to fit snug within the openings of the body members 16, 18. The posts 32 project upward from the transverse member 26 to top surfaces 38 of the posts. Electrical contacts 42 are mounted in the post top surfaces 38 in positions to engage in electrical contact with batteries contained in the interiors of the body members 16, 18. As seen in FIG. 8, the electrical contact 42 engages in electrical communication with a positive end 44 of a battery. An electrical conducting strip 46 extends downward over an interior wall 47 of the post from the electrical contact 42 to a section of the strip 48 at the bottom of the post interior. The conductive strip section 48 extends through the support base of the transverse member 26 to the post at the opposite side of the transverse member (not shown) and is connected to an electrical contact (not shown) in the other post in substantially the same manner as that shown in FIGS. 8 and 9. It should be understood that the strip sections 46 and 48 are formed of one continuous conductive strip. The electrical contacts 42 in both pairs of posts 32 together with the electrically conductive strip sections 46 and 48 connect the batteries contained in the interiors of each of the body members 16, 18 in series electrical communication with each other when the posts 32 are inserted into the body member openings to close the openings.

A releasable detent mechanism is provided in each of the support base transverse member posts 32 to releasably attach the posts 32 inside the openings of the body members. The detent mechanism shown in FIGS. 8 and 9 includes a pin having a pin head 52 that engages through aligned holes 54, 56 in the post 32 and the lower end of the body member 18 respectively, to releasably secure the post in the opening of the body member. The pin has a shank 58 formed integrally with the pin head 52. The shank 58 extends through holes in the Conductive strip section 46 and the post interior wall 47 and thereby mounts the pin for reciprocating movement in the post 32. The mounting of the pin in the post hole 54 and the holes in the strip section 46 and interior wall 47 enables the pin shank 58 to reciprocate transversely through the strip section 46 and interior wall 47 and allows the pin head 52 to reciprocate within the holes 54, 56 of the post and body member. A spring 62 biases the pin head 52 into engagement in the body member hole 56 to securely attach the support base transverse member post 32 in the opening of the body member. An annular collar 64 prevents the pin head 52 from passing completely through the post hole 54. By manually depressing the pin head 52 into the body member hole 56, the pin head may be disengaged from the hole 56 and the support base post 32 may then be disengaged from its insertion in the body member interior 34. In this manner the pin releasably attaches the support base transverse member post 32 in the interior 34 of the body member.

The pin construction described above with reference to FIGS. 8 and 9 is substantially identical in both support base posts 32. By simultaneously manually depressing both of the pin heads 52 into their respective body member holes 56 and then pulling the support base transverse member 26 longitudinally away from the bottom ends of the body members 16, 18, the posts 32 are disengaged and removed from the body member interiors 34. In this manner, access is provided to the interiors of the two body members 16, 18 to insert or replace batteries contained in the body members.

A pair of electrically conductive springs 66, 68 are provided in the topmost ends of the interiors of the two body members 16, 18 for engagement with the respective negative and positive ends of batteries inserted into the body member interiors. The spring 66 contained inside the body member 18 on the left side of the flashlight 10 as shown in FIG. 5 is connected to transverse member top wall 72 inside the transverse member 22 by an electrically conductive exterior sleeve 74. The exterior sleeve surrounds a tubular insulator 75 that in turn surrounds a tubular receiver jack for a post of the specialized rechargeable battery pack yet to be described.

A portion of the exterior sleeve 74 projects through the top wall to the exterior of the transverse member 22 where it is connected to an electrically conductive strip 76. A lamp trunnion 78 projects longitudinally upward from the transverse member top surface 72 and the electrically conductive strip 76 extends over the top surface 72 upwardly along the side of the lamp trunnion. The sleeve 74 connecting the spring 66 in the interior of the body member 18 to the strip 76 on the exterior of the transverse member provides an electrically conductive connection between the spring and the strip.

The spring 68 contained inside the body member 16 on the right side of the flashlight as shown in FIG. 5 is connected to the top surface 72 of the transverse member 22 by an electrically conductive rivet 82. However, the spring 68 is prevented from contacting the rivet 82 in electrical conducting contact by an insulating washer or disc 84 and an insulating sleeve 85. The spring 68 is connected in electrical communication with an electrically conductive bracket 86 that, in turn, is connected to a wire 88 leading to the manual switch 24. A second wire 92 leads from the manual switch 24 to an electrically conductive disc 94 that is connected in electrical communication with the rivet 82. Like the previously described sleeve 74, the rivet 82 is connected to an electrically conductive strip 96 that extends up the side of a second lamp trunnion 98. Both lamp trunnions 78, 98 are constructed as longitudinal extensions of the body members 18, 16 respectively, to enhance the structural strength of the flashlight.

The manual switch 24 is a conventional, two position press button switch contained in a flexible, sealing envelope. Depressing the switch closes electrical communication between the two wires 88, 92 and depressing the switch again opens the electrical connection between the two wires 88, 92. By closing the switch 24, an electric circuit is established from the battery in the right side body member 16 as viewed in FIG. 5, through the spring 68, the bracket 86, the first wire 88, the switch 24, the second wire 92, the conductive disc 94, the rivet 82, and the conductive strip 96.

It should be apparent from the description of the electronic circuit contained in the body portion 12 of the flashlight described above that when the manual switch 24 is closed an electric voltage is established between the conductive strips 76, 96, the voltage being dependent on the combined voltages of the batteries contained in the body members 16, 18. In, the preferred embodiment of the invention employing two D-size batteries in each body member 16, 18, closing the manual switch 24 produces a five volt potential across the conductive strips 76, 96. Opening the manual switch 24 breaks the circuit and produces a zero potential across the conductive strips 76, 96. Although specific details of the electric circuit of the body portion 12 have been set forth above, the circuit described is intended to be illustrative only of one manner of operating the flashlight of the present invention and is not intended to be limiting. A variety of other circuit arrangements may be employed with the flashlight to selectively illuminate the lamp portion 14 of the flashlight without departing from the scope of the invention defined in the claims.

The lamp portion 14 is comprised of a generally conical housing 102 having a pair of mounting blocks 104, 106 formed thereon. A pair of electrically conductive pivot pins 108, 112 extend through the mounting blocks 104, 106, respectively, and through coaxial holes provided for the pins at the upper ends of the two lamp trunnions 78, 98. The pair of pins 108, 112 are secured in the mounting blocks 104, 106 and the lamp trunnions 78, 98 by threaded fasteners 114, 116 secured on ends of the pins projecting beyond the lamp trunnions. Bearings 118, 122 are positioned between the threaded fasteners 114, 116 and the lamp trunnions 98, 78 and enable the lamp portion 14 of the flashlight to by pivoted through a variety of positions relative to the body portion 12 and held in the adjusted position relative to the body portion. As shown in FIG. 3, the pivoting connection provided between the lamp portion 14 and the lamp trunnions 78, 98 by the pivot pins 108, 112 enables the lamp portion to be adjustably positioned between a first position where the lamp directs a beam of light substantially perpendicular to the flashlight body members 16, 18, and a second position shown in phantom lines where the lamp directs a beam of light substantially parallel to the body members. The pivoting connection provided between the lamp portion 14 and the lamp trunnions 78, 98 also enables the lamp portion to be adjusted to any one of a variety of positions between the two positions shown in FIG. 3.

Figure 6:
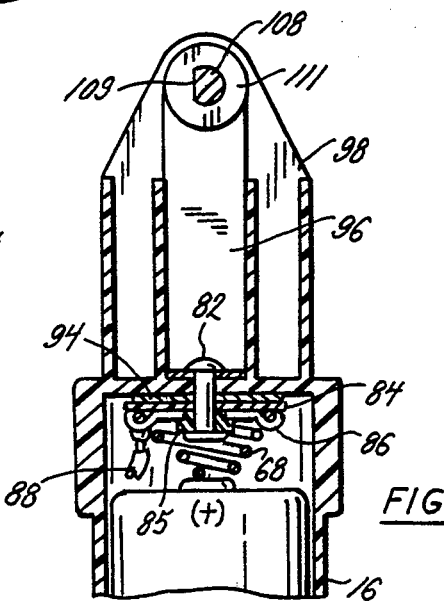
FIG. 6 is a partial side elevation view, in section, taken along the line 6—6 of FIG. 5.
Figure 5A:
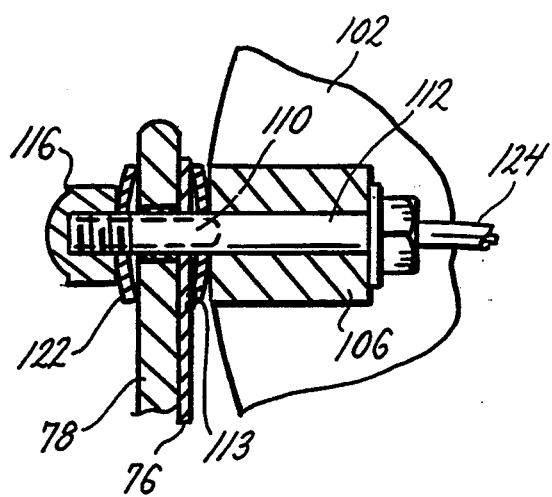
FIG. 5A is a partial view, in section, showing details of FIG. 5.

The two pivot pins 108, 112 are electrically conductive and provide electrical communication between the conductive strips 76, 96 and a pair of wires 124, 126 communicating with a bulb socket structure 128 in the interior of the lamp portion. As is best seen in FIGS. 5A and 6, the pins 108, 112 have respective flattened thread portions 109, 110 with D-shaped cross sections adjacent to their contact with the conductive strips 96, 76, respectively. Electrically conductive contact washers 111, 113 having D-shaped center holes are mounted on the flattened sections 109, 110 of the pins. The shape of the washer center holes secures the washers against rotation on the pins and the washers have a slight concavity that provides continuous electrical contact between the washers and their respective conductive strips 76, 96 and pins 112, 108 as the lamp is rotated between its first and second positions.

Figure 10:
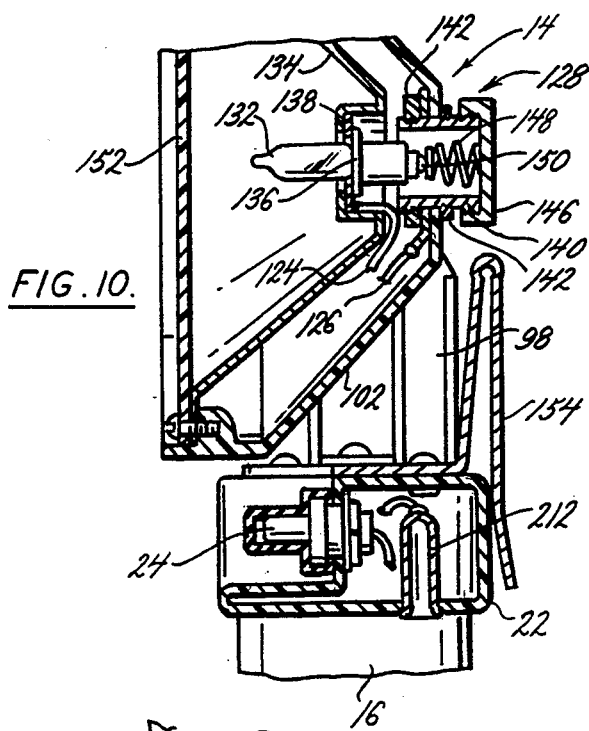
FIG. 10 is a partial side elevation view, in section, of the flashlight.

The bulb socket is specifically constructed to enable the bulb to be quickly and easily removed from the bulb socket and replaced-with a new bulb when necessary. The bulb socket structure 128 positions the filament portion of the bulb 132 in front of the center of a parabolic reflector 134 mounted in the lamp portion 14 of the flashlight. As best seen in FIG. 10, the bulb 132 is received within a cylindrical recess in the back of the parabolic reflector 134. Within the recess, the ring electrical contact 136 of the bulb abuts in electrical contact with an annular conductor 138 that is connected to the wire 124. The bulb socket structure 128 includes a cylindrical sleeve 140 having screw threading over its exterior surface. As seen in FIG. 10, the sleeve 140 is mounted in a hole in the center of the housing 102 at the back of the lamp portion 14 and is held in place by internally threaded nuts 142 screw threaded over the exterior of the sleeve in front and in back of the lamp portion housing 102. Secured around the sleeve 140 between the nut 142 in the interior of the lamp portion 14 and the interior surface of the lamp portion housing 102 is a second annular conductor 144 connected with the wire 126. A conductive cap 146 is screw threaded on the end of the sleeve 140 outside the housing 102 of the lamp portion 14. The screw threaded cap 146 has a conductive coil spring 148 in its interior that engages in electrical contact with the point contact 150 of the bulb 132 when the cap is screw threaded on the end of the sleeve 140. The engagement of the conductive spring 148 with the point contact 150 of the bulb 132 completes the electrical circuit from the wire 124, through the annular conductor 138 in the parabolic reflector recess, through the ring contact 136 of the bulb and the bulb filament to the point contact 150 of the bulb, and then through the cap spring 148, the cap 146, the sleeve 140, the annular conductor 144 and the wire 126. By unscrewing the cap 146 from the exterior end of the sleeve 140, the bulb 132 will fall out of the lamp portion 14 through the center of the sleeve 140. The bulb is easily replaced by inserting a new bulb through the sleeve interior and positioning the bulb inside the reflector recess with the ring contact of the bulb contacting the annular conductor 138 within the recess as shown in FIG. 10. The bulb socket structure 128 described enables the bulb 132 of the flashlight to be easily removed and replaced by solely removing the cap 146 from the end of the socket structure.

Figure 12:
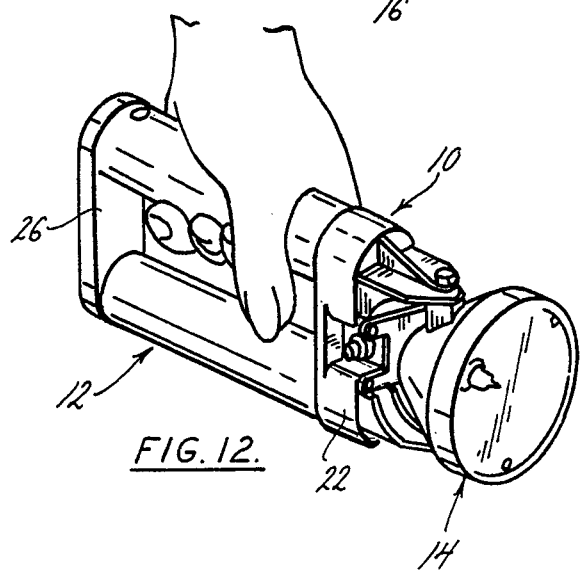
FIG. 12 is a perspective view showing one operative environment of the flashlight.

A circular transparent lens 152 covers over the front of the reflective surface of the reflector 134 and the bulb 132. The above described socket circuitry connecting the bulb socket structure 128 with the circuitry of the body portion 12 described earlier enables the bulb 132 to be selectively illuminated by closing the manual switch 24. The connection of the lamp portion 14 to the lamp trunnions 78, 98 enables a light beam projected from the bulb 132 and the reflector 134 to be directed in any one of a variety of directions between the first and second directions described above with reference to FIG. 3. Adjustments to the direction in which the lamp portion directs the beam of light may be made with the flashlight supported on a flat surface by the support base transverse member 26 as shown in FIG. 3. The lamp may also be adjusted with the flashlight body members 16, 18 laid flat on the surface. The adjustments to the position of the lamp portion 14 may also be made as the flashlight is comfortably carried in the hand of a user as shown in FIG. 12. Furthermore, the adjustments to the position of the lamp portion 14 may be made while the flashlight is suspended by a clip 154 from an article of clothing or equipment worn by a firefighter as shown in FIG. 13; thereby freeing up the hands of the firefighter.

Figure 13:
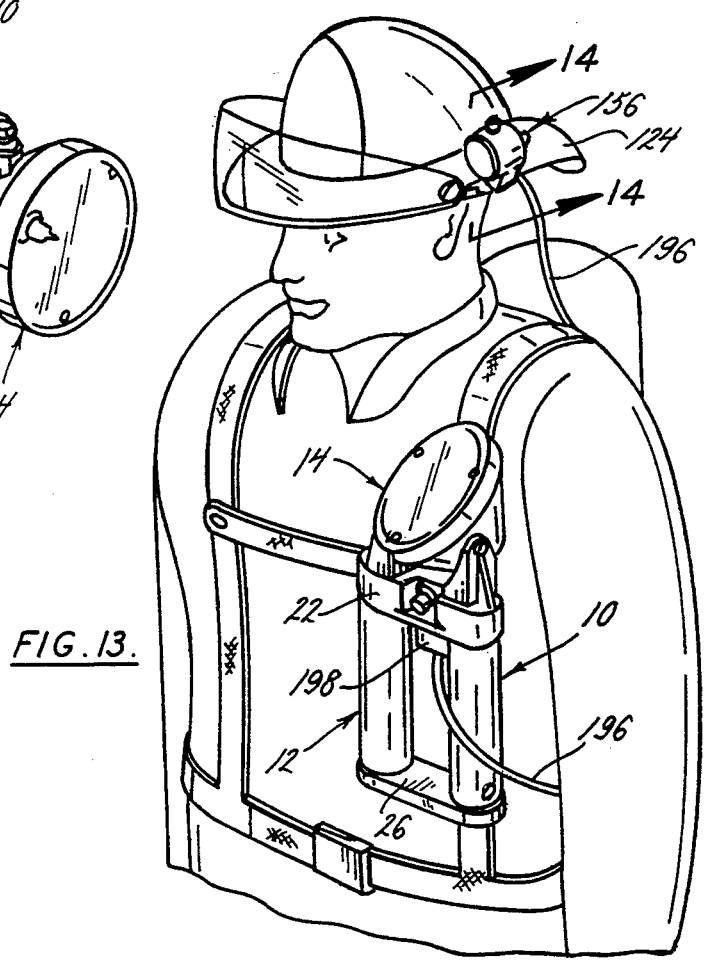
FIG. 13 is a perspective view showing another operative environment of the flashlight.

The flashlight of the invention is also provided with an auxiliary light shown in FIGS. 13-16. As shown in FIG. 13, the auxiliary light 156 is designed to be clipped to the brim of a firefighter's helmet or, like the flashlight 10 itself, may be suspended from an article of clothing or equipment worn by a firefighter, or held in either hand of the firefighter to direct the beam of the auxiliary light. The auxiliary light 156 is powered by the same power source as the flashlight as will be explained. The auxiliary light 156 is constructed with a cylindrical housing 158 having a transparent lens 160 at the forward end of the housing and a back wall 162 at the rearward end of the housing. A press button switch 164 contained beneath a sealing envelope is mounted on the cylindrical housing 158 of the light. The switch 164 is of the same type of switch 24 employed in the flashlight. However, other types of electrical switches may be employed. A parabolic reflector 166 is provided Just behind the lens 160 in the interior of the light housing 158. Like the reflector of the flashlight, the auxiliary light reflector 166 is provided with a recessed cavity at its rearward end for receiving a bulb 168. The auxiliary light has a bulb socket structure substantially identical to that of the flashlight. Centered at the rear of the reflector 166 is a cylindrical cup 172 for receiving the bulb 168. The cup 172 is conductive and replaces the annular conductor 138 of the flashlight socket assembly. A wire 174 provides an electrical connection between the conductive cup 172 and the switch 164. A second wire 176 extends from the switch and exits the auxiliary light housing 158. The bulb 168 is received within the cup 172 with the ring electrical contact 178 of the bulb engaging in electrical contact with the interior of the conductive cup 172. A cylindrical sleeve 180 having a screw threaded exterior surface is mounted in the center of the light backwall 162. The sleeve 180 is secured in place by a pair of screw threaded nuts 182. An annular conductor 184 is positioned over the exterior of the sleeve 180 and is held between one of the screw threaded nuts 182 and the interior surface of the light backwall 162. The annular conductor 184 is connected to a wire 186 that exits the light through the housing wall 158. A conductive cap 188 is secured to the end of the conductive sleeve 180 at the exterior of the auxiliary light. The conductive cap 188 has a conductive coiled spring 192 connected thereto, and the spring extends through the center bore of the sleeve 180 and engages in electrical contact with the point contact 194 of the bulb 168.

With the socket assembly of the auxiliary light assembled as shown in FIG. 16, an electrical circuit is established from the wire 176 through the switch 164, the wire 174, the conductive cup 172 of the reflector, the bulb ring contact 178, the bulb point contact 194, the cap spring 192, the cap 188, the conductive sleeve 180, the annular conductor 184 and the wire 186. By selectively depressing the manual switch 164, this electrical circuit is alternately closed and opened to selectively illuminate the bulb 168 of the auxiliary light 156. Like the socket structure of the flashlight, the bulb 168 of the auxiliary light is easily removed and replaced by unscrewing the cap 188 from the exterior end of the sleeve 180 and allowing the bulb 168 to fall out of the interior of the light through the center of the sleeve 180. A new bulb is then inserted through the sleeve 180 and positioned in the reflector cup 172 as shown in FIG. 16, and the cap is then screwed back onto the exterior end of the sleeve to complete the replacement of the bulb in the auxiliary light.

The two wires 176, 186 extending from the auxiliary light 156 are surrounded by an insulator 196 and extend to a two-prong plug 198. The two prongs 202, 204 of the plug 198 are dimensioned to be received in two of three electrically conductive jacks 206, 208, 212 mounted in a bottom wall 214 of the flashlight top transverse member 22 extending into the interior of the transverse member. The third jack 212 is employed with the specialized rechargeable battery pack of the invention yet to be described. The first electrically conductive jack 206 is connected by a wire 214 to the conductive strip 76 which, as explained earlier, is connected in electrical communication with the batteries contained in the left side tubular member 18 of the flashlight as viewed in FIG. 5. The second electrically conductive Jack 208 is connected to the wire 88 that extends between the manual switch 24 and the bracket 86, connecting the jack 208 in electrical communication with the batteries contained in the right side tubular member as viewed in FIG. 5. From this description of the electrical connections between the two Jacks 206, 208 and the batteries contained in the tubular body members 16, 18 of the flashlight, it should be apparent that inserting the plug prongs 202, 204 of the auxiliary light 156 into the jacks 206, 208 provides electrical power from the power source contained in the flashlight 10 to the auxiliary light 156. With the prongs of the plug 198 plugged into the pair of jacks 206, 208, the bulb 168 of the auxiliary light 156 may be selectively illuminated by depressing the manual switch 164 of the light.

Like the flashlight 10, the auxiliary light 156 is provided with a clip 216 secured to its backwall 162 for releasably securing the light to an article of clothing or equipment worn by a firefighter. The auxiliary light is also provided with a bracket 218 and clamp 222 assembly for removably securing the auxiliary light to the brim 224 of a firefighter's helmet. As best seen in FIGS. 14–16, the bracket 218 is formed with a bottom ledge 226 having a General V-shape. A backwall 228 extends upward from the bottom ledge 226. The ledge 226 and backwall 228 are configured to receive the cylindrical housing 158 of the light on the ledge and against the backwall with the clip 216 of the light engaging against the backwall and securing the light in position on the ledge. A flange 232 extends downward from the bracket ledge 226 and is bent in a General L-shape. The L-shape of the flange 232 causes a remote segment 234 of the flange to project forward of the light 156. The clamp 222 of the auxiliary light bracket has a General U-shape in cross section with a lower lip 236 dimensioned to engage beneath the helmet brim 224 and a pair of upper arms 238, 242 dimensioned to engage over the top of the helmet brim 224 and over the remote flange segment 234 of the bracket flange. A set screw 244, 246 is screw threaded through each of the clamp arms 238, 242, respectively. By positioning the clamp 222 over the helmet brim 224 and the remote flange segment 234 of the bracket flange 232 in the position shown in FIGS. 14–16, and by screwing down the pair of set screws 244, 246, the auxiliary light bracket 218 and clamp 222 provide a support for the auxiliary light 156 on the brim 244 of the firefighter's helmet without requiring any alterations to the helmet. The bracket 218 and clamp 222 also enable the auxiliary light 156 to be removed from its mounting on the helmet brim if so desired, and then later mounted back on the bracket by the clip 216 of the auxiliary light.

Figure 11:
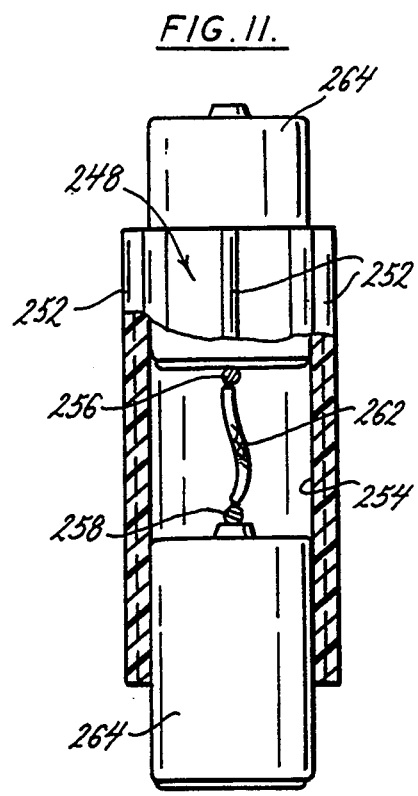
FIG. 11 is a partially sectioned view of an adapter employed with the flashlight.

Although the flashlight 10 of the present invention is described above as being powered by four D-size dry cell or rechargeable batteries, an adaptor 248 provided with the flashlight 10 adapts it to be used with C-size dry cell or rechargeable batteries for powering the flashlight. As seen in FIG. 11, the adaptor 248 is generally a cylindrical member having a plurality of circumferentially spaced projecting ribs 252 extending longitudinally over its circumference. The ribs 252 are all substantially identical and the diameter of the adapter defined by the radial projection of the ribs is specifically dimensioned to substantially match the exterior diameter of conventional D-size batteries. A bore hole 254 extends through the interior of the adaptor. The bore hole has an internal diameter measure substantially equal to the external diameter measure of conventional C-size batteries. A pair of electrically conductive pins 256, 258 are secured in and extend across the internal bore 254 of the adaptor. The pins are interconnected in electrical communication by a wire 262. By inserting a pair of C-size dry cell batteries 264 in the opposite ends of the internal bore of the adaptor as shown in FIG. 11, the conducting pins 256, 258 engage the positive and negative contacts of the batteries and establish a series connection between the two batteries in much the same manner as is established when two D-size batteries are placed in contact with each other with the positive surface of one battery engaging the negative surface of the other battery. The two Conducting pins 256, 258 are positioned or spaced longitudinally from each other in the interior of the adaptor to position the exposed positive and negative surfaces 0f the two C-size batteries 264 apart from each other substantially the same distance as the distal positive and negative surfaces of two D-size batteries placed end to end. In this manner, the adaptor 248 with two C-size batteries 264 inserted therein will occupy the same volume in the interiors of the flashlight body members 16, 18 as two D-size batteries placed end to end in the body member interiors. In this way, the adaptor 248 enables the replacement of two D-size dry cell or rechargeable batteries in the interiors of the body members 16, 18 with two C-size dry cell or rechargeable batteries.

Figure 21:
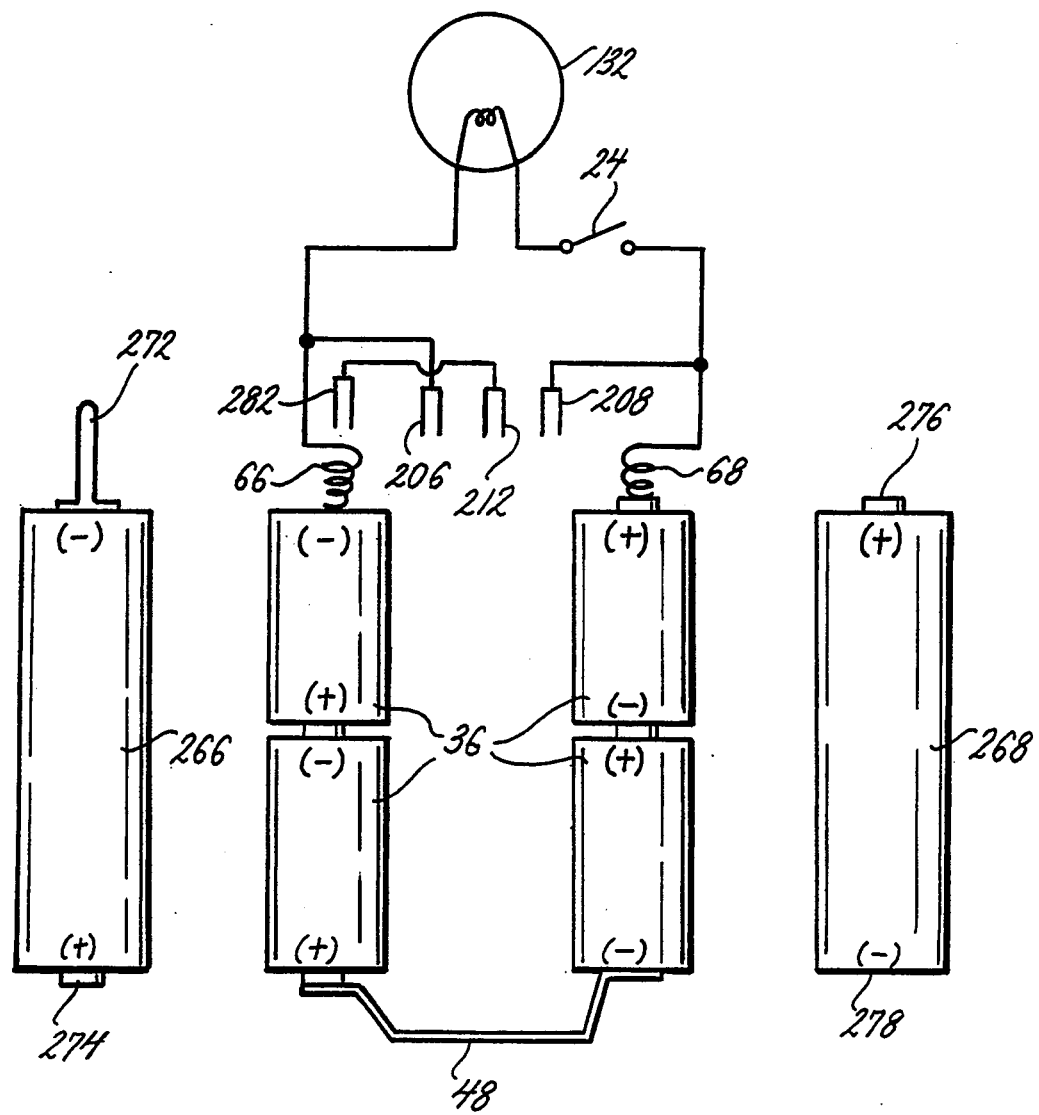
FIG. 21 is a schematic representation of the electric circuit and the specialized battery packs of the invention.

Besides conventional D-size and C-size dry cell batteries and rechargeable batteries, the flashlight of the invention includes specialized rechargeable battery packs. FIG. 21 shows a schematic representation of the electronic circuit of the flashlight, together with schematic representations of the specialized rechargeable battery packs of the present invention. The circuit diagram of FIG. 21 shows four conventional batteries 36 contained in the tubular members 16, 18 and their interconnections with the electronic circuit. The four batteries can be D-size dry cells or D-size rechargeable batteries. As seen in the schematic, when the switch 24 is closed, an electric circuit is completed through the four batteries and the bulb 132 which illuminates the bulb. When the switch 24 is opened, the circuit is broken and the bulb goes out.

Two of the three conductive jacks 206, 208 are connected directly into the circuit of the flashlight. Inserting the two prongs 202, 204 of the auxiliary light plug 198 into the pair of Jacks 206, 208, and closing the auxiliary light switch 164 completes an electric circuit through the auxiliary light that illuminates the auxiliary light bulb 168. Opening the auxiliary light switch 164 breaks the circuit and the auxiliary light bulb goes out. The dimensions of the auxiliary light plug 198 and the spacing of the plug prongs 202, 204 from each other prevents the prongs from being inserted into the center electrically conductive jack 212 and either one of the two remaining jacks 206, 208. The plug prongs of the auxiliary light can only be inserted into both the electrically conductive jacks 206, 208.

Also shown in FIG. 21 are the specialized rechargeable battery packs 266, 268 of the present invention. The pair of battery packs 266, 268 are substantially identical to a pair of conventional, 1.25 volt rechargeable batteries except for their overall dimensions and a charging post 272 affixed to the negative end of one of the packs 266. Each of the packs are cylindrical and the diameter of each of the packs 266, 268 is substantially equal to that of a conventional D-size battery. The longitudinal length of each of the packs 266, 268 is substantially equal to the longitudinal length of two D-size batteries placed end-to-end as is represented in the schematic of FIG. 21. The positive ends of both packs 266, 268 are provided with a projecting land 274, 276 as are conventional batteries. The negative end 278 of one of the two packs is flat, and as explained earlier, the negative end of the other of the two packs has the projecting negative post 272.

The two specialized rechargeable battery packs are inserted into the tubular members of the flashlight in place of the four D-sized batteries shown in the schematic of FIG. 21. FIG. 5 shows the positive land 276 of one pack 268 engaging in electrical contact with the conductive spring 68 in the tubular member 16 of the flashlight, and shows the negative end including the negative post 272 of the other pack 266 projecting up through the center of the conductive spring 66 and engaging in electrical contact in a conductive jack 282. The engagement of the conductive spring 66 with the flat surface at the negative end of the left side pack 266 as viewed in FIG. 5 provides electrical communication between the pack and the spring 66. The negative post 272 of the pack 266 is used solely for recharging the pack in place in the tubular members of the flashlight. With both of the specialized rechargeable battery packs 266, 268 contained in the tubular members 16, 18 of the flashlight, an electrical circuit is provided in much the same manner described earlier as when four D-size batteries are inserted into the tubular members of the flashlight. With the packs 266, 268 inserted into the flashlight tubular members, besides establishing the electrical circuit for selective operation of the bulb 132 by depressing the switch 24, the engagement of the pack negative post 272 in the electrical jack 282 enables the rechargeable packs to be recharged in place in the tubular members of the flashlight by connecting a recharger to the pair of jacks 208, 212.

FIGS. 17–20 show the mounting bracket 286 of the present invention that is employed in both storing the flashlight 10 of the invention and in providing an electrical connection between the specialized rechargeable battery packs 266, 268 contained in the tubular members of the flashlight and a battery recharger. The storage bracket 286 is comprised of a top support surface 292 and a backwall 294 extending downward from the support surface. A plurality of triangular shaped gussets 296 extend between the support surface and the backwall and reinforce the support surface. A pair of holes 298 are provided through the backwall 294 for mounting the support bracket to a wall surface by threaded fasteners 302 as shown in FIGS. 18–20.

Mounted on the top surface of the bracket are three prongs 304, 306, 308. Each of the three prongs are dimensioned and spaced from each other to be inserted into the three electrical contact jacks 206, 212, 208 of the flashlight. By positioning the three jacks 206, 212, 208 of the flashlight over the three prongs 304, 306, 308, respectively, and then by moving the flashlight downward, the three prongs 304, 306, 308 are inserted into the three jacks 208, 212, 206, thereby securing and supporting the flashlight on the support bracket 286.

As shown in FIG. 19, the two right most prongs 306, 308 are connected through wires 312, 314, respectively, with a battery charger 316. The third prong 304 is merely mounted on the support surface of the bracket 286 and is not electrically connected to the charger 316. When the flashlight 10 is mounted on the support bracket 286, the two prongs 306, 308 are connected in electrical contact with the two jacks 212, 208. This connection provides an electrical circuit from the charger 316, through the prong 306 and jack 212, through the jack 282 and negative post 272 of one pack 266 of the rechargeable battery packs of the invention, through the conductive strip 48 of the flashlight to the second pack 268 of the rechargeable battery packs, and through the jack 208 and the prong 308 back to the charger 316, completing the circuit. By attaching the flashlight 10 on the support bracket 286 in this manner, the two packs 266, 268 of the specialized rechargeable battery packs of the invention may be recharged in place inside the tubular members of the flashlight while the flashlight is stored on the bracket. However, because of the specialized connection between the negative post 272 of the one pack 266 and the jack 282 of the flashlight circuit, if conventional batteries are contained inside the tubular members of the flashlight and the flashlight is stored on the bracket 286, the recharging circuit is broken and the recharger 316 will have no effect on the batteries contained in the tubular members.

While the present invention has been described by reference to a specific embodiment, it should be understood that modifications and variations of the invention may be constructed without departing from the scope of the invention defined in the following claims.

What is claimed is:

1. A flashlight comprising:
   a body portion having an exterior and a hollow interior, the interior being configured to contain at least one standard battery as a power source of the flashlight;
   a lamp mounted on the body portion of the flashlight, the lamp containing an electric light;
   a first electric circuit contained in the body portion and the lamp, the first electric circuit being capable of providing electric communication between the electric light contained in the lamp and a standard battery when said standard battery is contained in the body interior to power illumination of the electric light;
   a rechargeable battery pack configured to be contained in the body portion interior and connected in the first electric circuit to power illumination of the electric light; and,
   a second electric circuit contained in the body portion, the second electric circuit connecting the rechargeable battery pack in the second electric circuit when the rechargeable battery pack is contained in the interior of the body portion and the second electric circuit not connecting the standard battery in the second electric circuit when the standard battery is contained in the interior of the body portion.

2. The flashlight of claim 1, wherein: the standard battery includes a conventional D-size battery.

3. The flashlight of claim 1, wherein: the standard battery includes a conventional, rechargeable D-size battery.

4. The flashlight of claim 1, wherein: the standard battery includes a conventional C-size battery.

5. The flashlight of claim 1, wherein: the standard battery includes a conventional, rechargeable C-size battery.

6. The flashlight of claim 1, wherein:
   the second electric circuit includes a coupling on the exterior of the body portion and a recharger, separate from the flashlight, is connectable to the coupling to connect the recharger in the second electric circuit, where the second electric circuit communicates the recharger connected to the coupling in electric communication with the rechargeable battery pack when said rechargeable battery pack is contained in the flashlight enabling the recharger to supply power to and recharge the rechargeable battery pack, and where the second electric circuit does not communicate the recharger connected to the coupling in electric communication with the standard battery when said standard battery is contained in the flashlight and does not enable the recharger to supply power to the standard battery.

7. The flashlight of claim 1, wherein:
   the rechargeable battery pack has first and second, separate electrical contacts, the first electrical contact connects the battery pack in the first electric circuit when the battery pack is contained in the body portion interior, and the second electrical contact connects the battery pack in the second electric circuit when the battery pack is contained in the body portion interior.

8. The flashlight of claim 6, wherein:
   the first electric circuit includes a coupling on the exterior of the body portion and the flashlight includes an auxiliary device, separate from the flashlight, that is connectable to the coupling of the first electric circuit to connect the auxiliary device in the first electric circuit.

9. The flashlight of claim 8, wherein:
   the auxiliary device is an auxiliary light that is connected in the first electric circuit when it is connected to the coupling of the first circuit and receives power to illuminate the auxiliary light through the first circuit when the standard battery is contained in the body portion, and when the battery pack is contained in the body portion.

10. The flashlight of claim 7, wherein:
    a coiled spring is connected in the first electric circuit, the coiled spring has opposite ends, one end of the spring engages against the first electrical contact of the battery pack and connects the battery pack in the first electric circuit when the battery pack is contained in the body portion interior, and the one end of the spring engages against a surface of the standard battery and connects the standard battery in the first electric circuit when the standard battery is contained in the body portion interior,
    a tubular conductive jack is connected in the second electric circuit, the jack has an opening at one end and the second electrical contact of the battery pack is inserted into the jack opening and connects the battery pack in the second electric circuit when the battery pack is contained in the body portion interior.

11. The flashlight of claim 10, wherein:
    the coiled spring and the tubular conductive jack are coaxial.

12. The flashlight of claim 11, wherein:
    the first electrical contact of the battery pack is a conductive exterior surface area of the battery pack and the second electrical contact of the battery pack is a conductive post that projects from the surface area, and the one end of the coiled spring engages against the surface area of the battery pack and the post projects axially through the coiled spring into the opening of the conductive jack when the battery pack is contained in the body portion interior.

13. The flashlight of claim 11, wherein:
    the one end of the coiled spring engages the surface of the standard battery and spaces the surface from contact with the conductive jack when the standard battery is contained in the body portion interior.

14. The flashlight of claim 11, wherein:
the auxiliary device is an auxiliary light that is connected in the first electric circuit when it is connected to the first coupling.

15. A flashlight comprising:
a body portion having an exterior and a hollow interior, the interior being configured to contain at least one standard battery as a power source of the flashlight;
a lamp mounted on the body portion of the flashlight, the lamp containing an electric light;
a first electric circuit contained in the body portion and the lamp, the first electric circuit being capable of providing electric communication between the electric light contained in the lamp and a standard battery when said standard battery is contained in the body portion interior to illuminate the electric light;
the first electric circuit includes a first coupling on the exterior of the body portion and the flashlight includes an auxiliary device, separate from the flashlight that is connectable to the first coupling to connect the auxiliary device in the first electric circuit and thereby provide power to the auxiliary device from the first electric circuit;
a rechargeable battery pack configured to be contained in the body portion interior and connected in the first electric circuit to power illumination of the electric light and to power the auxiliary device connected to the first coupling when said rechargeable battery pack is contained in the body portion interior; and
a second electric circuit is contained in the body portion, the second electric circuit connecting the rechargeable battery pack in the second electric circuit when the rechargeable battery pack is contained in the interior of the body portion, and the second electric circuit not connecting the standard battery in the second electric circuit when the standard battery is contained in the interior of the body portion.

16. The flashlight of claim 15, wherein:
the second electric circuit includes a second coupling on the exterior of the body portion and a recharger, separate from the flashlight, is connectable to the second coupling to connect the recharger in the second electric circuit, where the second electric circuit communicates the recharger connected to the second coupling in electric communication with the rechargeable battery pack when the rechargeable battery pack is contained in the flashlight enabling the recharger to supply power to and recharge the rechargeable battery pack, and where the second electric circuit does not communicate the recharger connected to the second coupling in electric communication with the standard battery when the standard battery is contained in the flashlight and does not enable the recharger to supply power to the standard battery.

17. The flashlight of claim 15, wherein:
the rechargeable battery pack has first and second, separate electrical contacts, the first electrical contact connects the battery pack in the first electric circuit when the battery pack is contained in the body portion interior, and the second electrical contact connects the battery pack in the second electric circuit when the battery pack is contained in the body portion interior.

* * * * *